Figure 11:
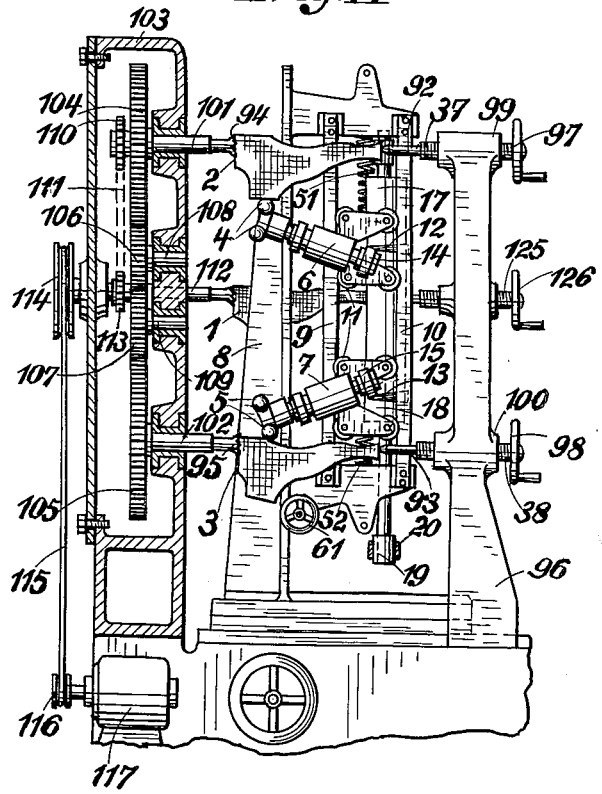

April 11, 1961
L. BISCHOFF
2,979,088
DUPLICATING MILLING MACHINE FOR WOOD
Filed July 30, 1956
3 Sheets-Sheet 1
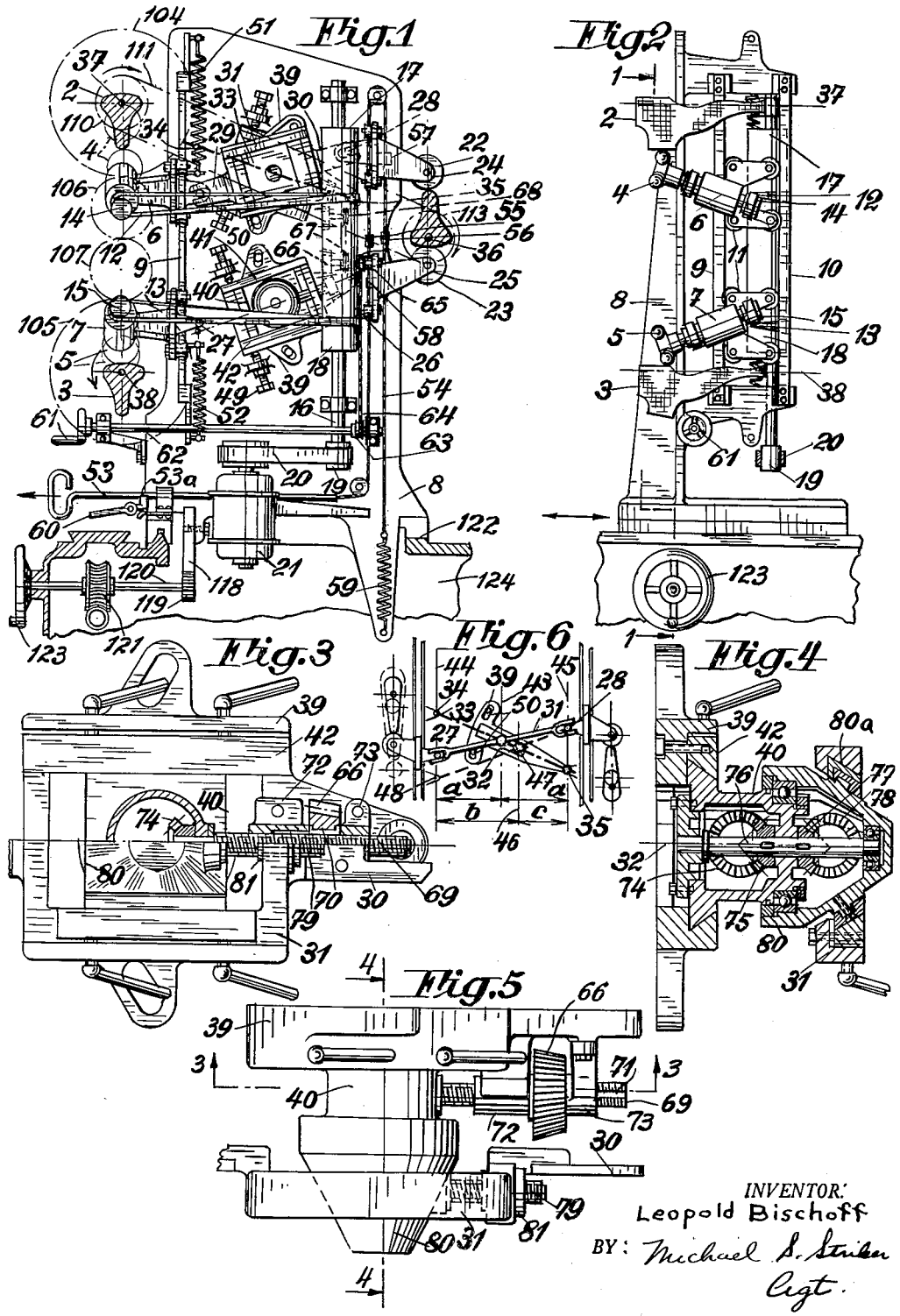
INVENTOR:
Leopold Bischoff
BY: Michael S. Striker
Agt.

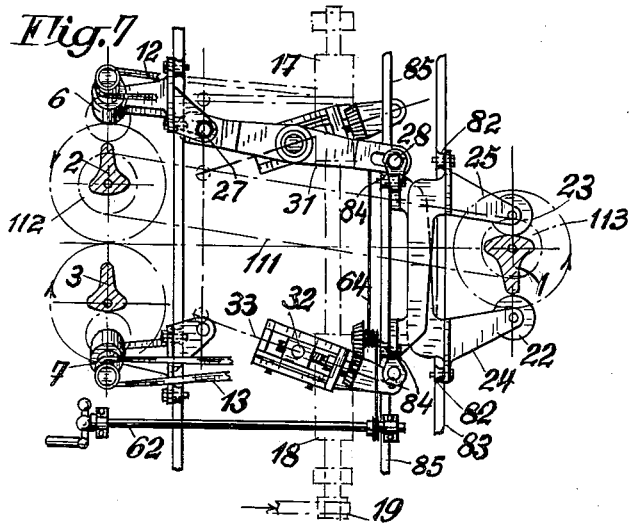
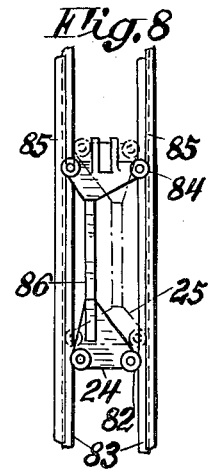
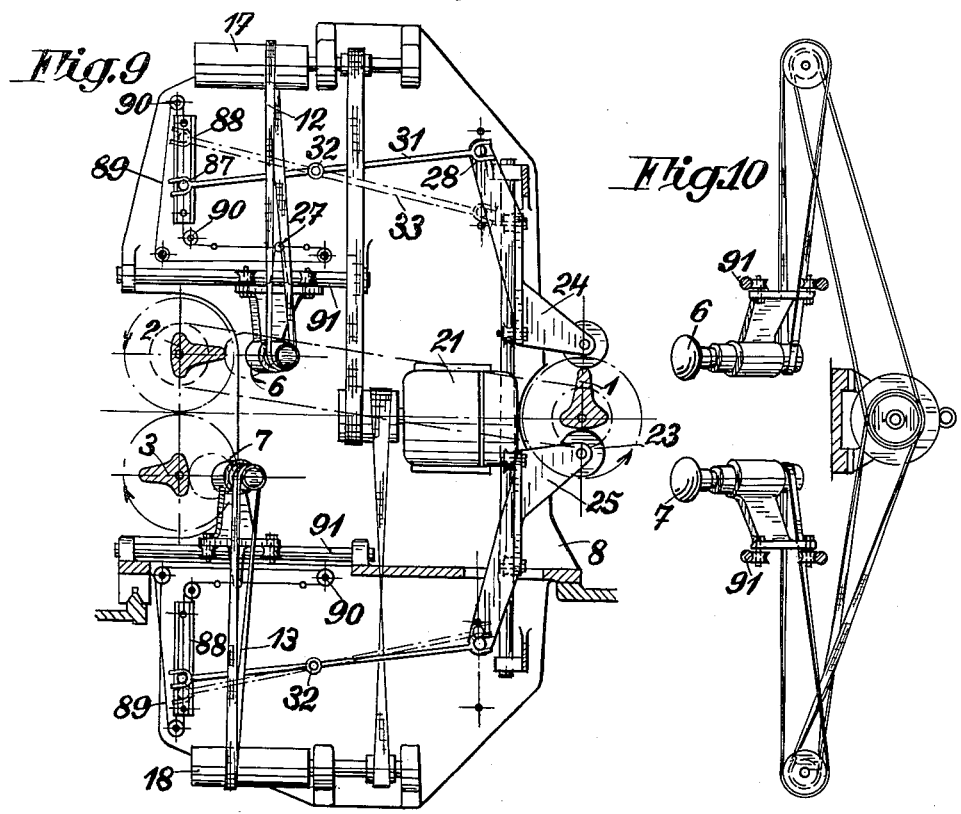
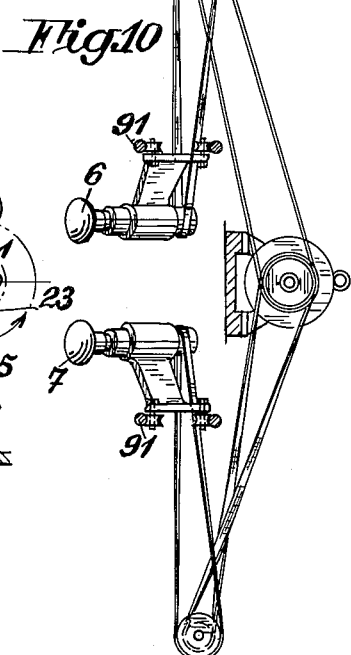

April 11, 1961 L. BISCHOFF 2,979,088
DUPLICATING MILLING MACHINE FOR WOOD
Filed July 30, 1956 3 Sheets-Sheet 3

INVENTOR.
Leopold Bischoff
BY
Michael S. Striker
Attorney

United States Patent Office 2,979,088
Patented Apr. 11, 1961

2,979,088
DUPLICATING MILLING MACHINE FOR WOOD

Leopold Bischoff, Vienna, Austria, assignor to Fa. Maschinenfabrik Zuckermann Komm. Ges. Wien, Vienna, Austria Filed July 30, 1956, Ser. No. 600,947

Claims priority, application Austria July 30, 1955

10 Claims. (Cl. 142—7)

The output of a copying machine for wood depends mainly on the light weight of the masses which are moved during each revolution of the pattern and which transfer the shape of the pattern to the workpieces. This is significant particularly in fine duplicating work using eccentric patterns which deviate highly from a circular shape, because when the speed becomes too high the surface of the workpieces will no longer have the desired precision and quality. It is known to urge the moving masses by spring force or similar means against the pattern, which consists in most cases of hardwood. A follower roller rolls along the pattern while the latter performs a rotary movement in synchronism with the workpieces. For this reason the form of the follower roller corresponds to the form of the teeth of the cutter head. The limited strength of the model and the inertia of the moving masses impose certain limits to the increase of the speed and these limits can be exceeded only if the size of the moving masses is reduced.

In modern copying machines for wood the oscillating mass comprises in most cases two or even three inserted tooth cutters. For the manufacture of shoe lasts, however, only two inserted teeth cutters can be used, for the right and left lasts, respectively. According to the present invention the moving masses are reduced in size by dividing the same so that a separate follower roller is provided for each inserted tooth cutter and each inserted tooth cutter and each follower roller is carried in a separate small carriage, which carriages slide in parallel or relatively inclined straight guides, the displacement of a follower roller carriage being transmitted by a two-armed lever means directly or by means of intermediate members to the associated cutter carriage which carries a tool carrying and operating means, whereas a spring force is exercised on the cutter carriage to urge the follower roller against the pattern and to eliminate any backlash between the cutter carriage and the follower roller. On the other hand an increase or decrease of the displacement of the cutter carriages relative to that of the follower roller carriages is obtained by a displacement of the fulcrum of the two-armed lever. The fulcrum of one lever means is displaced along a straight line, which lies in the common plane extending through the points of articulation of the follower roller carriage and of the associated cutter carriage in their zero position, which is considered the position in which the axes of the pattern and of the workpieces are contacted by the follower roller and the cutter teeth, respectively.

By the division into a follower roller carriage and a cutter carriage with a connecting two-armed lever, whose center of gravity lies in or adjacent to its axis, the moving masses can be minimized. A displacement of the fulcrum of the lever will, moreover, enable an accurate undistorted enlargement or reduction of the width of the workpiece without using a special width pantograph. To obtain an enlargement or reduction in the longitudinal direction the pattern must be longitudinally displaced by means of a length pantograph, as has already been provided for in known machines. In that case the pattern is driven by a spline shaft.

It is accordingly an object of the present invention to provide a copying machine wherein the moving masses are of relatively small size.

Another object of the present invention is to provide a copying machine with pattern followers which engage the pattern without exerting unbalanced, one-sided forces thereon so that the pattern is not unduly stressed and will not bend.

A further object of the present invention is to provide a compact structure for changing the relation between the size of the workpieces with respect to the pattern.

An additional object of the present invention is to provide a copying machine wherein the contours of the pattern are very accurately transmitted to the workpieces.

The invention is diagrammatically illustrated in the drawing, which shows several embodiments by way of example. Fig. 1 is a partially sectional side view of an embodiment of the duplicating milling machine for wood, according to the invention, the section being taken along line 1—1 of Fig. 2. Fig. 2 is a front view of the same embodiment. Figs. 3, 4 and 5 are respectively a partly sectional front view, a transverse sectional view and a top plan view, respectively, showing a detail of the machine according to Figs. 1 and 2. The section of Fig. 3 being taken along lines 3—3 of Fig. 5 and the section of Fig. 4 being taken along line 4—4 of Fig. 5. Fig. 6 is a diagrammatic showing of the mode of operation. Figs. 7 and 8 illustrate a modification, in which the shoe lasts are arranged one beside the other. Figs. 9 and 10 show another embodiment in which the inserted tooth cutters are horizontally movable and operate from the rear. Fig. 11 shows the structure which supports and rotates the pattern and workpieces and which enables the cutters and follower to move axially along the workpieces and pattern, respectively.

In Figs. 1 and 2, numeral 1 denotes the pattern of the left last. The workpieces 2 and 3 constitute a left last and a right one, respectively. The pattern 1 and the lasts 2 and 3 are caused to rotate synchronously by rotary spindles, the last 3 rotating in a sense opposite to that of last 2 and pattern 1. The lasts 2 and 3 are machined by the inserted tooth cutters 4 and 5, respectively, which may be set at an angle in the usual manner and are carried respectively in a pair of tool carrying and operating means which are in turn carried by the cutter carriages 6 and 7. These carriages are vertically guided by means of the rollers 11 between the guides 9 and 10 affixed to the longitudinal support 8, parts 9–11 forming a guide means for the carriages. The cutters 4 and 5 are driven by the crossed belts 12 and 13, which extend at one end around the belt pulleys 14 and 15, respectively, and at the other end around the belt pulleys 17 and 18, respectively, affixed on the common shaft 16. The belt pulleys 17, 18 are driven by the electric motor 21 by means of the pulley 19 and the belt 20. The cutter carriages 6 and 7 are controlled by the pattern by means of the follower rollers 22 and 23, respectively, which are carried in the follower carriages 24 and 25, respectively. The latter are vertically guided by means of the rollers 26 in guides affixed to the longitudinal support 8. These guides are not shown for the sake of simplicity and form with the rollers 26 a guide means for the follower carriages. The cutter carriages 6 and 7 and the follower carriages 24 and 25 are provided on the inside with freely movable articulated joints 27 and 28, respectively, which are suitably constructed as anti-friction bearings. These are embraced by the forked ends 29 and 30 of the two-armed levers 31, the lower one of which is not shown for the sake of simplicity. The lever 31 is rotatable on the fulcrum pivot 32. This structure is shown diagrammatically in Fig. 6. The levers 31 form a pair of lever means which respectively transmit movement of the follower carriages to the cutter carriages for causing the cutters to cut the workpieces in correspondence with the configuration of the pattern.

In order to enlarge or increase the scale the pivot 32 must be displaced to the right or left, respectively, along a plane 33 extending through the points 34 and 35. These points correspond to the zero positions of the joints 27 and 28, respectively, i.e. to those positions of these joints when the followers 22 and 23 contact the axis 36 of the pattern and the inserted teeth cutters 4 and 5 contact the axes 37 and 38 of the lasts. To this end supports 39 are provided, in which a hollow block or pivot carrier 40 carrying the pivot 32 is displaceable along the plane 33 between the guides 41 and 42.

Fig. 6 gives a diagrammatic showing of the mode of operation. In the case of a manufacture true to scale the fulcrum of the lever 31 must lie at the intersection of the plane 33 with the center plane 43 between the planes 44 and 45, in which the joints 27 and 28 slide up and down. To enlarge the scale the fulcrum 32 is displaced to the right into the plane 46 and assumes the position 47. Then the lever 31 is displaced into the position shown in broken lines, the joint 28 remaining in position whereas the joint 27 is moved to position 48. The enlargement ratio is $b:c$, as is apparent from the similitude of the triangles 34, 47, 48 and 28, 47, 35. The supports 39 (Fig. 1) are rotatable about the points 35 and are adjusted by means of the adjusting screws 49 and are fixed by means of the screws 50.

By increasing or reducing the spacing of the points 34 and displacing the pivots 32 to the right or left the toe portion of the last can be reduced or increased in thickness without changing the shoe size, as is sometimes desirable. The tension springs 51 and 52 serve to urge the follower rollers against the pattern. Since they bear on the cutter carriages any backlash in all joints up to the pattern is eliminated. The withdrawal of the follower rollers from the pattern and of the inserted tooth cutters from the lasts to enable the latter to be replaced by new ones is effected by the draw rod 53 through the intermediary of the chain 54 and blocks 55 and 56 affixed thereto, which engage stops 57 and 58 carried by the follower roller carriages. Thus the spring 59 is extended until the latch 60 falls into a notch of the draw rod 53. As is apparent from Fig. 1 the latch or catch member 60 is pivotally supported intermediate its ends and has an upwardly directed tooth extending into a notch 53a of the rod 53 in the position of the latter shown in Fig. 1. A leaf spring urges the right or toothed end of the catch member 60 upwardly, as is apparent from Fig. 1. The rod 53 is provided adjacent its right end, as viewed in Fig. 1, with an additional notch (not shown). Thus, the operator, when it is desired to remove the followers from the pattern and the cutters from the workpieces, will manually turn the catch member 60 in a clockwise direction, as viewed in Fig. 1, against the force of the leaf spring to move the tooth of the catch member out of the notch 53a, and then the operator will pull the rod 53 to the left, as viewed in Fig. 1. As a result the right run of the chain 54, as viewed in Fig. 1, will move upwardly while the left vertical run of this chain 54 will move downwardly. Therefore, the block 56 carried by the right run will move upwardly while the block 55 carried by the left run of the chain will move downwardly. The stop member 57 carried by the follower carriage 24 is located in the path of movement of the block 56, while the stop member 58 carried by the lower follower carriage is located in the path of movement of the block 55. Thus, as the rod 53 is pulled to the left, the blocks 56 and 55 will respectively engage the stop members 57 and 58, and during the continued movement of the blocks while the rod 53 is pulled to the left, the follower carriages will be moved away from the pattern, and due to the connection of the follower carriages to the cutter carriers through a pair of lever means 31 the cutter carriages also will be simultaneously moved away from the turning axes of the workpieces, respectively. This movement of the rod 53 is continued until the leaf spring urges the tooth of the catch member 60 into the notch which is adjacent the right end of the rod 53, as viewed in Fig. 1, and in this way the machine is maintained in a position where the followers and cutters are out of engagement with the pattern and workpieces, respectively, so that the pattern and workpieces may be changed. Thereafter, the catch member 60 is again turned by the operator so as to release the chain 54 and the rod 53 to the force of the spring 59 which returns the parts to the position indicated in Fig. 1, the movement of the rod 53 to the right under the influence of the spring 59 being limited by engagement of the catch member 60 with the notch 53a.

The adjustment for enlarging or reducing the scale is effected by the hand wheel 61 through the intermediary of the shaft 62, the chain sprocket 63, the endless chain 64, the chain sprocket 65 and the bevel wheels 66 acting by means of a screw spindle on the pivot carrier 40 of the lower lever, and from the shaft of the chain sprocket 65 through the intermediary of the chain sprocket 67, an endless chain, the chain sprocket 68 and bevel wheels to the pivot carrier 40 of the upper support 39.

When the pivot 32 is displaced out of the plane 43 the lever 31 would also be displaced, and in this case long slots would be necessary at the joints 27 and 28. Therefore, the spacing between the follower roller carriage and the cutter carriage would also have to be increased. In order to save space the pivot carrier 40 of the supports 39 in Fig. 1 is constructed as part of a compensating mechanism. According to the present invention a displacement of the pivot carrier in the support 39 takes place while the lever means remains stationary so that the ends of the lever will not be laterally displaced. Details of the lever and compensating mechanism are apparent from Figs. 3, 4 and 5.

As may be seen from Figs. 3-5, the support 39 is provided with the guides 42 of dovetail cross section, and the pivot carrier 40, which is hollow, is guided by the guides 42 for movement along the support 39, this movement taking place in the plane 33 in the case of the upper lever 31 of Fig. 1 and in the corresponding plane in the case of the lower lever 31 of Fig. 1. The support 39 fixedly carries by means of a bracket 72 a nut 81, and a screw member 69 extends through and is in threaded engagement with the nut 81. The screw member 69 is connected to the hollow pivot carrier 40 for free rotation with respect thereto but is axially immovable with respect to the hollow pivot carrier 40. The screw member 69 is formed with an axial groove 71, and between the bracket 72 and a bearing 73 for the screw member 69 one of the bevel gears 66 surrounds the screw member 69 and has at its inner periphery a key 70 fixed to the bevel gear 66 and extending into the groove 71. Thus, the bevel gear 66 and screw 69 are compelled to rotate together while the screw 69 is axially shiftable with respect to the bevel gear 66, the latter being maintained axially immovable with respect to the support 39 by the bracket 72 and the bearing 73. Thus, it is apparent that when the bevel gear 66 is rotated in the manner described above the screw 69 will turn and will shift axially with respect to the nut 81, and the pivot carrier 40 of the pivot means 32 will also shift together with the screw member 69 along the guides 42.

The pivot carrier 40 pivotally carries a pivot member 80 for free rotation with respect to the pivot carrier 40, and the turning axis of the pivot member 80 determines the turning axis of the lever 31. Fig. 4 clearly shows a ball bearing supporting the pivot member 80 for free rotation on the hollow pivot carrier 40, the pivot member 80 itself being in the form of a hollow substantially conical member. The lever 31 itself is formed with a pair of opposed parallel guides 80a of dovetail cross section (Fig. 4), so that the lever 31 is shiftable with respect to the pivot member 80. The lever 31 fixedly carries a second nut 81 through which a screw member 79 extends, this screw member 79 being in threaded engagement with the nut 81, and the screw member 79 is turnably connected to the pivot member 80 but is axially immovable with respect thereto.

The screw member 69 fixedly carries within the hollow pivot carrier 40 a bevel gear 74, and the screw member 79 fixedly carries within the hollow pivot member 80 a bevel gear 78 of the same diameter and having the same number of teeth as the bevel gear 74. At its right end, as viewed in Fig. 4, the hollow pivot gear 40 terminates in an end wall formed with a bore which supports for rotation about its axis a shaft extending perpendicularly to the parallel axes of the screw members 69 and 79 and fixedly carrying at opposite sides of the end wall of the hollow pivot carrier 40 a pair of bevel gears 75 and 77 which respectively mesh with the bevel gears 74 and 78 and which are respectively of the same size and have the same number of teeth.

Thus, when the screw member 69 turns, the bevel gear 74 will turn, and the transmission means 74, 75, 77, 78 will cause the screw members 79 to turn through the same number of degrees as the screw member 69. The threads of the members 69 and 79 are identical and the nuts 81 are identically threaded so that when the screw member 69 advances axially with respect to the nut 81 carried by the bracket 72, the nut 81 carried by the lever 31 will advance axially through the same distance, and with the arrangement shown the lever 31 will in effect shift through the same distance as the pivot carrier 40 but in the opposite direction. Actually, the lever 31 appears to remain stationary while the pivot member 80 shifts along the lever 31, and in this way the pivot axis of the lever means is changed while the lever means itself remains stationary, so that it is unnecessary to provide extremely long slots at the ends of the lever means and the organization is far more compact than would otherwise be the case.

In the embodiment according to Figs. 1 and 2 the two inserted tooth cutters are disposed between the two lasts so that these may appear to be spaced rather widely apart for practical purposes. Figs. 7 and 8 show an embodiment in which the lasts are disposed one beside the other. To this end the follower roller 22 associated with the upper cutter carriage 6 is downwardly displaced and the follower roller carriage 24 is upwardly prolonged. The two lower rollers 82 of the latter carriage roll between a pair of parallel guides 83, the two upper rollers 84 roll between a pair of parallel guides 85. Both ends of the follower roller carriage are interconnected by the arm 86. The same applies in reverse to the lower cutter carriage 7 and the associated follower roller carriage 25.

Figs. 9 and 10 show another embodiment, in which the inserted tooth cutters are horizontally movable and operate from the rear. To this end the levers 31 do not directly engage with one arm the joints 27 of the cutter carriages 6 and 7 but that arm engages joints 87, which slide in vertical guides 88 and are affixed to endless steel bands 89, to which the joints 27 are affixed too, which serve in this case only as fixing points rather than as joints. The steel bands 89 are freely movably guided by means of the rollers 90 along the guides 88 and along the horizontal guides 91 of the cutter carriages.

With the embodiment of Figs. 9 and 10 the cutters are fed horizontally toward and away from the axes of the workpieces, respectively. The steel bands 89 serve in cooperation with the guide rollers 90 to convert the vertical movement of the left end of the lever means 31 to horizontal movement for providing the necessary horizontal shifting movement of the carriages which carry the tool carrying and operating means. These carriages are shiftable along the horizontal shafts 91 and the connecting point 27 of each of these carriages is connected directly with the steel band 89. The guide rollers 90 are so arranged that when the member 87 fixed to the steel band 89 is moved through a predetermined vertical distance upon turning of the lever means 31 the member 27 will be shifted through a corresponding horizontal distance and thus the cutter carriage will also be shifted through this same horizontal distance. In this way, the up and down movements of the left end of each lever means 31 is converted into a horizontal movement for moving each cutter carriage where the latter is supported for horizontal movement as illustrated in Figs. 9 and 10.

Fig. 11 illustrates the structure which supports the workpieces and pattern for rotation as well as part of the structure for feeding the cutters and followers longitudinally of the workpieces and pattern, respectively. As may be seen in Fig. 11, a housing 103 is fixedly carried by the bed of the machine and houses in its interior a plurality of driving gears, the right wall of the housing 103, as viewed in Fig. 11, being provided with bearings for rotatably supporting the several drive shafts. Thus, the drive shaft 101, whose axis determines the axis of rotation 37 of the upper workpiece 2, is rotatably supported in a suitable bearing carried by the right wall of the housing 103, as viewed in Fig. 11, and in the interior of the housing 103 the drive shaft 101 fixedly carries a gear 104. Furthermore, the drive shaft 101 carries a gripping device 94 which grips the workpiece 2 at its left end, as viewed in Fig. 11, for causing the workpiece 2 to rotate together with the shaft 101. For example, the workpiece 2 may have an extension in the form of an elongated pin or the like and the gripping device 94 may be in the form of a collet which grips this extension so as to fixedly connect the workpiece 2 with the shaft 101, the collet being engaged and disengaged in a known way. The bed of the machine also carries, on suitable ways which extend to the left and right, as viewed in Fig. 11, a tailstock 96 provided at its top end with an internally threaded sleeve portion 99 which threadedly receives the center 92 whose conical left end extends into a conical recess at the right end of the workpiece 2, as viewed in Fig. 11, in a well known manner, and the hand-wheel 97 serves to permit the center 92 to be manually operated so as to be moved to and from its position engaging and supporting the workpiece 2 for rotation about the axis 37, the center 92 of course being coaxial with the shaft 101.

The gear 104 meshes with an intermediate gear 106 fixedly carried by a stub shaft 108 which is supported for rotation by a suitable bearing in the right wall of the housing 103, as viewed in Fig. 11. Gear 106 in turn meshes with gear 107 which is fixedly carried by a second stub shaft 109 rotatably carried by the right wall of the housing 103. The gear 107 in turn meshes with the gear 105 which is fixedly carried by the shaft 102 which is supported for rotation by its axis by the right wall of the housing 103 and which is located directly beneath the shaft 109. The shaft 102 carries a gripping device 95 identical with the gripping device 94, and the tailstock 96 has a lower center 93 identical with the center 92 and operated by a hand-wheel 98, the shafts 102 and 93 determining the axis of rotation 38 of the lower workpiece 3 and serving to rotate the work-piece supporting the same for rotation. The relative sizes and positions of the gears 104, 106, 107, 105 with respect to each other is apparent from Fig. 1 where these gears are diagrammatically illustrated.

The frame of the machine carries a driving motor 117 which drives a pulley 116, which through the belt 115 drives a second pulley 114 mounted on a shaft which is supported for rotation by the left wall of the housing 103, as viewed in Fig. 11, adjacent the rear wall of the housing 103. The shaft which carries the pulley 114 fixedly carries in the interior of the housing 103 a sprocket wheel 113, and the shaft 112 which carries both the sprocket wheel 113 and the pulley 114 extends completely through the housing 103 and is in driving engagement at its right end with the pattern 1, the shaft 112 determining the axis of rotation 36 of the pattern 1. The tailstock 96 carries an additional center 125 which cooperates with the right end of the pattern 1 and which is operated by the hand-wheel 126.

The shaft 101 fixedly carries in the interior of the housing 103 a sprocket wheel 110, and the sprocket chain 111 extends from the sprocket wheel 113 to the sprocket wheel 110, so that in this way the drive is transmitted from the motor 117 to the gear 104. Thus, with this construction the drive is transmitted from the single motor 117 to the workpieces and pattern in a manner which rotates the workpieces in opposite directions, and the transmission is such that the rotating workpieces and pattern are held to rotate in synchronism with each other because of the fact that they are driven from a common source.

The entire supporting frame 8 for the structure shown in Figs. 1 and 2 is longitudinally shiftable along the bed of the machine for feeding the cutters longitudinally of the workpieces, respectively, and the follower rollers longitudinally of the pattern. Thus, as may be seen from Fig. 1 the bed 124 of the machine is provided with ways 122 which cooperate with grooves at the underside of the support 8 to guide the latter for longitudinal movement. A rack 118 (Fig. 1) is fixedly connected to the supporting frame 8 and extends parallel to the ways 122, and this rack 118 meshes with a pinion 119 fixedly carried by a shaft 120 supported for rotation about its axis by suitable bearings and fixedly carrying a wormwheel 121. A worm cooperates with the worm gear 121 to rotate the latter and thus feed the supporting frame 8 together with all of the structure carried thereby longitudinally with respect to the workpieces and follower. Manual longitudinal shifting of the frame 8 and the structure carried thereby may be provided by a hand-wheel 123 fixed to the shaft 120. When it is desired to manually shift the frame 8 the shaft which carries the worm which meshes with the wormwheel 121 is shifted downwardly into an inoperative position so that the worm does not at this time mesh with the wormwheel 121 and the carriage 8 may be shifted manually with the handwheel 123. For automatic feeding of the cutters and pattern followers the shaft which carries the worm is returned to its operating position which places the worm in driving engagement with the wormwheel 121.

When the above-described machine is operated, the rod 53 is pulled out so as to move the cutter carriages and the follower rollers away from the workpiece axes and the pattern axis, respectively. Then, the workpieces are mounted on the machine in the manner described above in connection with Fig. 11, and also the pattern is mounted on the machine in the manner described above in connection with Fig. 11. The rod 53 is then released so that the follower rollers engage the pattern at opposite sides thereof and the cutters engage the workpieces, respectively. It will be noted that the follower rollers always engage the pattern at diametrically opposed portions thereof so that the pressures applied to the pattern by the followers compensate each other and as a result the pattern itself is not subjected to any one-sided or unbalanced forces and there is no tendency for the pattern to bend. The motor 117 is turned on so that the pattern and workpieces rotate and the frame 8 is automatically fed longitudinally in the above-described manner. As the pattern followers follow the contour of the pattern under the influence of the springs 51 and 52 the movement of the follower carriages is transmitted through the levers 31 to the cutter carriages which thus move to cause the cutters to cut the workpieces in correspondence with the pattern. Before the operation of the machine is started, the handwheel 61 may be turned to shift the pivot axes of the pair of lever means 31 to the right or left, as viewed in Figs. 1 and 6, so that the desired enlargement or reduction of the size of the workpieces with respect to the size of the pattern will be provided. When the cutting of the workpieces is completed, the machine is stopped and the rod 53 is pulled out so that the cutters move away from the workpieces and the follower rollers move away from the pattern, and then either the workpieces may be changed for a pair of unfinished workpieces and/or the workpieces and pattern may be exchanged, and then the operations can be started again in the above-described manner.

What is claimed is:

1. In a copying machine for simultaneously manufacturing a pair of complementary parts, such as a pair of shoe lasts, from a single pattern, in combination, pattern support means for supporting a pattern for rotation about a predetermined axis; a pair of pattern followers respectively located at opposite sides of said axis for simultaneously engaging diametrically opposed portions of a pattern carried by said support means; a pair of follower carriages respectively carrying said followers; guide means engaging said follower carriages for guiding the latter to move said followers toward and away from said axis; a pair of work support means for respectively supporting a pair of workpieces for respective rotation about a pair of additional axes; a pair of tool carrying and operating means respectively located adjacent said pair of additional axes; a pair of additional carriages respectively carrying said pair of tool carrying and operating means; second guide means guiding said pair of additional carriages for movement toward and away from said pair of additional axes, respectively; a pair of lever means respectively interconnecting said pair of first-mentioned carriages with said pair of additional carriages for moving said pair of additional carriages in correspondence with the movement of said pair of first-mentioned carriages when the latter move in response to movement of said followers toward and away from said first-mentioned axis; and means urging said followers toward said first-mentioned axis.

2. In a copying machine as recited in claim 1, said pair of tool carrying and operating means being located between said pair of additional axes.

3. In a copying machine as recited in claim 1, said pair of additional axes being located between said pair of tool carrying and operating means.

4. In a copying machine as recited in claim 1, said pair of tool carrying and operating means being respectively located beside and at substantially the same elevation as said pair of additional axes.

5. In a copying machine as recited in claim 1, a pair of pivot means respectively supporting said pair of lever means for turning movement; and support means supporting said pair of pivot means for shifting movement between said pair of follower carriages, on the one hand, and said pair of additional carriages, on the other hand, for controlling the relationship between the size of the workpieces with respect to the size of the pattern.

6. In a copying machine as recited in claim 5, moving means operatively connected to said pair of pivot means for moving the latter while maintaining said pair of lever means substantially stationary so that the pivot axes of said pair of lever means, respectively, may be changed without any substantial movement of said pair of lever means.

7. In a copying machine as recited in claim 1, a pair of pivot means respectively supporting said pair of lever means for turning movement; and a pair of support means respectively supporting said pair of pivot means for movement along a pair of straight lines respectively passing through the pivot axes defined by said pair of pivot means and the connections between said pair of lever means and said carriages when said pair of additional carriages locate tools carried by said pair of tool carrying and operating means respectively at said pair of additional axes and said follower carriages locate said followers at said first-mentioned axis.

8. In a copying machine as recited in claim 7, and moving means operatively connected to said pair of pivot means for respectively moving the same along said straight lines to control the size of the workpieces with respect to the size of the pattern.

9. In a copying machine, in combination, a pivot carrier; guide means guiding said pivot carrier for movement along a straight line; a first nut carried by said guide means; a first screw member connected rotatably to said pivot carrier but being axially immovable with respect thereto and threadedly engaging said first nut, so that upon axial shifting of said first screw member with respect to said first nut due to turning movement of said first screw member with respect to said first nut, said pivot carrier will shift along said guide means; a pivot member rotatably carried by said pivot carrier for movement therewith along said guide means; a lever carried by said pivot member for turning movement therewith and being longitudinally shiftable along said pivot member; means engaging said lever and substantially preventing shifting thereof in longitudinal direction; a second nut carried by said lever; a second screw member turnably connected to said pivot member but being axially immovable with respect thereto, said second screw member threadedly engaging said second nut; and motion transmitting means extending between and engaging said first and second screw members for turning said second screw member upon turning of said first screw member and for advancing said second nut along said second screw member by the same distance that said pivot carrier advances along said guide means but in an opposite direction, so that the pivot axis of said lever shifts along said guide means while the lever itself remains substantially stationary.

10. In a copying machine for simultaneously manufacturing a pair of complementary parts, such as a pair of shoe lasts, from a single pattern, in combination, pattern support means for supporting a pattern for rotation about a predetermined axis; a pair of pattern followers respectively located at opposite sides of said axis for simultaneously engaging diametrically opposed portions of a pattern carried by said support means; a pair of follower carriages respectively carrying said followers and mounted for movement toward and away from said axis; means engaging said followers for maintaining the same in engagement with a pattern at diametrically opposed portions thereof while the pattern rotates, so that forces exerted on said pattern by said followers couner-balance each other and the pattern itself is not subject to excessive stress or caused to bend; a pair of work support means for respectively supporting a pair of work pieces for respective rotation about a pair of additional axes; a pair of tool carrying and operating means; a pair of additional carriages respectively carrying said pair of tool carrying and operating means, said additional carriages being located adjacent said pair of additional axes and mounted for movement respectively toward and away therefrom; and a pair of motion transmitting means respectively interconnecting said pair of follower carriages with said pair of additional carriages for moving said pair of additional carriages in correspondence with the movement of said pair of follower carriages when the latter move in response to movement of said followers toward and away from said first mentioned axis.

References Cited in the file of this patent

UNITED STATES PATENTS

| | | |
|---|---|---|
| 961,580 | Bostock | June 14, 1910 |
| 1,277,203 | Ensign | Aug. 27, 1918 |
| 1,293,276 | Whipple | Feb. 4, 1919 |
| 1,407,728 | Whipple | Feb. 28, 1922 |
| 1,946,253 | Winkle | Feb. 6, 1934 |
| 2,703,114 | Winkle | Mar. 1, 1955 |
| 2,765,819 | Koch | Oct. 9, 1956 |
| 2,770,264 | Eklund | Nov. 13, 1956 |